United States Patent
Mote et al.

(10) Patent No.: US 9,479,516 B2
(45) Date of Patent: Oct. 25, 2016

(54) AUTOMATIC DETECTION OF FRAUDULENT RATINGS/COMMENTS RELATED TO AN APPLICATION STORE

(71) Applicant: Google Inc., Mountain View, CA (US)

(72) Inventors: Nicolaus Todd Mote, Mountain View, CA (US); Sharon Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/764,290

(22) Filed: Feb. 11, 2013

(65) Prior Publication Data
US 2014/0230053 A1    Aug. 14, 2014

(51) Int. Cl.
| | | |
|---|---|---|
| *G06F 11/00* | (2006.01) | |
| *H04L 29/06* | (2006.01) | |
| *G06Q 30/02* | (2012.01) | |

(52) U.S. Cl.
CPC .......... *H04L 63/12* (2013.01); *G06Q 30/0282* (2013.01)

(58) Field of Classification Search
USPC ...................................... 726/22–25; 713/188
See application file for complete search history.

(56) References Cited

U.S. PATENT DOCUMENTS

| | | | |
|---|---|---|---|
| 6,182,059 B1 * | 1/2001 | Angotti et al. ................. 706/45 |
| 6,516,056 B1 * | 2/2003 | Justice et al. ................. 379/145 |
| 7,519,562 B1 | 4/2009 | Vander Mey et al. | |
| 7,882,192 B2 * | 2/2011 | Rajan et al. ................. 709/206 |
| 8,056,128 B1 * | 11/2011 | Dingle et al. ................... 726/22 |
| 8,424,091 B1 * | 4/2013 | Su et al. ......................... 726/24 |
| 2011/0321072 A1 * | 12/2011 | Patterson et al. ................. 725/5 |
| 2012/0259617 A1 | 10/2012 | Indukuri et al. | |

OTHER PUBLICATIONS

Myle Ott et al., Estimating the Prevalence of Deception in Online Review Communities, WWW 2012—Session: Fraud and Bias in user Ratings, Apr. 16-20, 2012, pp. 201-210, Lyon, France.
Tripadvisor, We Have Zero Tolerance for Fake Reviews!, http://www.tripadvisor.com/pages/fraud.html, p. 1.
Arjun Mukherjee, et al., Spotting Fake Reviewer Groups in Consumer Reviews, WWW 2012, Apr. 16-20, 2012, 10 pages, Lyon, France.
EESR for 14154220.9 dated Apr. 22, 2014.

* cited by examiner

*Primary Examiner* — Amare F Tabor
(74) *Attorney, Agent, or Firm* — Morris & Kamlay LLP

(57) ABSTRACT

The present disclosure describes one or more systems, methods, routines and/or techniques for automatic detection of fraudulent ratings and/or comments related to an application store. The present disclosure describes various ways to differentiate fraudulent submissions (e.g., ratings, comments, reviews, etc.) from legitimate submissions, e.g., submissions by real users of an application. These various ways may be used to generate intermediate signals that may indicate that a submission is fraudulent. One or more intermediate signals may be automatically combined or aggregated to generate a detection conclusion for a submission. Once a fraudulent submission is detected, the present disclosure describes various ways to proceed (e.g., either automatically or manually), for example, the fraudulent submission may be ignored, or a person or account associated with the fraudulent submission may be penalized. The various descriptions provided herein should be read broadly to encompass various other services that accept user ratings and/or comments.

20 Claims, 5 Drawing Sheets

AUTOMATIC DETECTION OF FRAUDULENT RATINGS/COMMENTS RELATED TO AN APPLICATION STORE

FIELD

The present disclosure relates to analyzing user-submitted ratings and/or comments, and more particularly to one or more systems, methods, routines and/or techniques for automatic detection of fraudulent ratings and/or comments related to an application store

BACKGROUND

Users may discover and download software applications through an interface associated with an on-line application marketplace (otherwise known as an "application store"). The software applications may be compatible with an operating system that is run by computing devices (e.g., mobile devices, PCs or the like). Users may browse and search (e.g., via the application store) a catalog of available applications. The application store may provide information related to each application in the catalog, for example, a user rating, reviews and comments. Users that are considering whether to download and install an application may view this information to determine whether the application is a quality application. The application store may allow users (e.g., users that have previously used an application) to submit information related to the application, for example, user ratings, reviews and comments.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for automatic detection of fraudulent ratings and/or comments related to an application store. The present disclosure describes various ways to differentiate fraudulent submissions (e.g., ratings, comments, reviews, etc.) from legitimate submissions, e.g., submissions by real users of an application. These various ways may be used to generate intermediate signals that may indicate that a submission is fraudulent. One or more intermediate signals may be automatically combined or aggregated to generate a detection conclusion for a submission. Once a fraudulent submission is detected, the present disclosure describes various ways to proceed (e.g., either automatically or manually), for example, the fraudulent submission may be ignored, or a person or account associated with the fraudulent submission may be penalized. The various descriptions provided herein should be read broadly to encompass various other services that accept user ratings and/or comments.

These and other advantages, aspects and novel features of the present disclosure, as well as details of an illustrated embodiment thereof, will be more fully understood from the following description and drawings. It is to be understood that the foregoing general descriptions are examples and explanatory only and are not restrictive of the disclosure as claimed.

BRIEF DESCRIPTION OF THE DRAWINGS

Several features and advantages are described in the following disclosure, in which several embodiments are explained, using the following drawings as examples.

DETAILED DESCRIPTION

Figure 1:
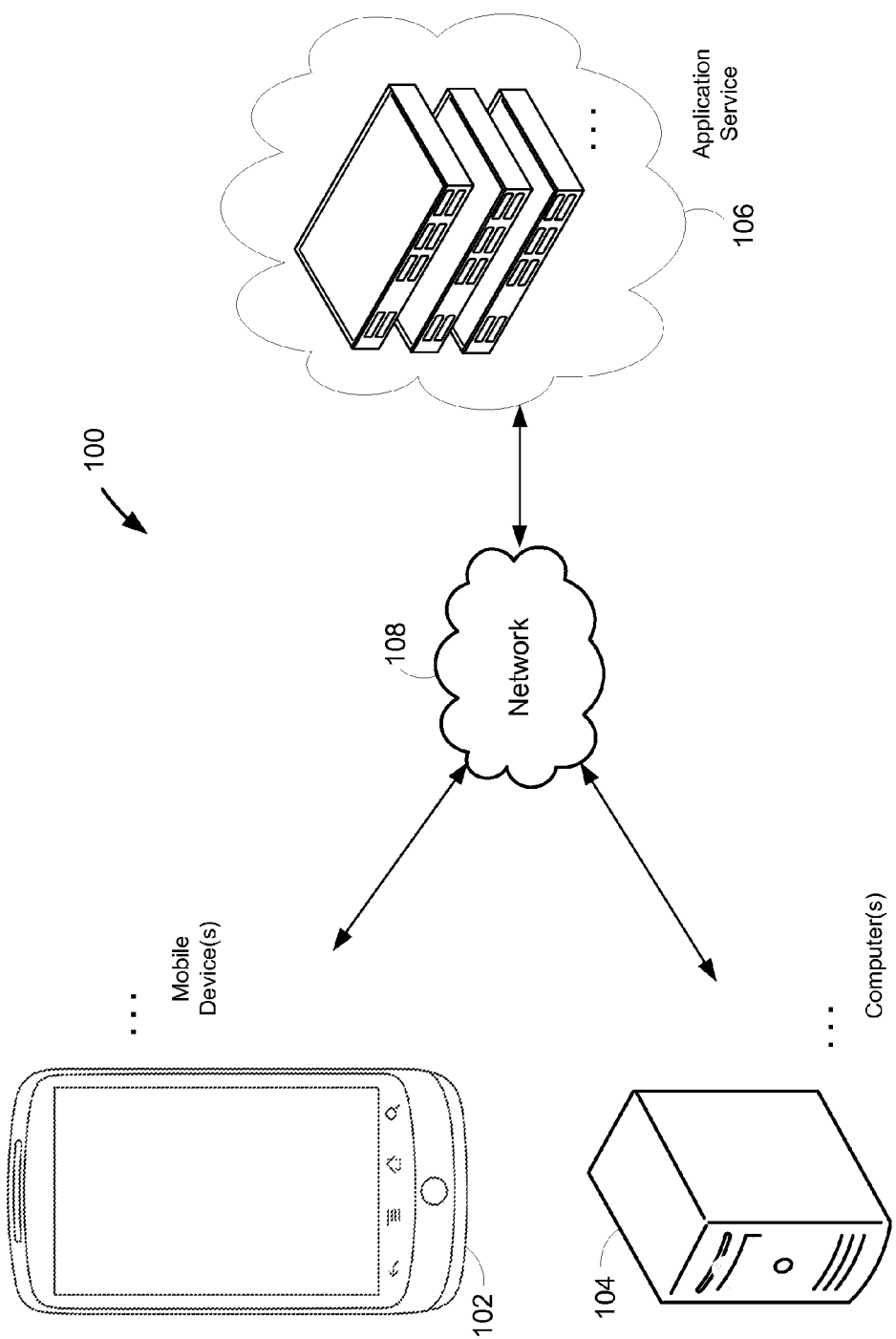
FIG. 1 depicts a block diagram showing example components, connections and interactions of a network setup, where one or more embodiments of the present disclosure may be useful in such a network setup.

Various application stores may allow users to submit information related to software applications (e.g., productivity apps, games, etc.) and/or other content (e.g., music, books, movies, etc.). The information submitted by users (i.e., submissions) may be, for example, user ratings, reviews, comments, user flags or other information that expresses a review or amount of favorability of the associated application. The submitted information may be used by the application store (or by search engines or other services) to rank, rate or suggest good applications and/or demote, ignore or remove had or undesirable applications. For example, if a user searches an application store by keyword or browses applications by category, applications that are rated more highly may be ranked more highly. Ideally, users that submit information about an application will be users that have actually used the application or content, or have in some-way experienced a real event related to the application or content. Ideally, these users will be honest about their experience with the application/content and are not simply submitting information to game a ranking system associated with the application store, in other words, ideally, these users will be "legitimate" users. Unfortunately, not all information submitted for an application or other content is legitimate or deserving of credit. In some instances, unscrupulous developers may submit fake reviews or comments in order to cause their own applications to appear (e.g., during browsing or the search ranking process) better or to cause competing applications to appear worse.

The present disclosure describes one or more systems, methods, routines and/or techniques for automatic detection of fraudulent ratings and/or comments related to an application store. The present disclosure describes various ways to differentiate fraudulent submissions (e.g., ratings, comments, reviews, etc.) from legitimate submissions, e.g., submissions by real users of an application. These various ways may be used to generate intermediate signals that may indicate that a submission is fraudulent. One or more intermediate signals may be automatically combined or aggregated to generate a detection conclusion for a submission.

Once a fraudulent submission is detected, the present disclosure describes various ways to proceed (e.g., either automatically or manually), for example, the fraudulent submission may be ignored, or a person or account associated with the fraudulent submission may be penalized, or the benefactor (e.g., an application or its developer) of fraudulent positive submissions may be penalized. It should be understood that although various descriptions herein may refer to information submitted via an application store, the systems, methods, routines and/or techniques for automatic detection of fraudulent ratings and/or comments may be used for any service where users rate or review things on-line (e.g., on-line product shopping, on-line review of services rendered, on-line review of establishments or locations, etc.). Therefore, the descriptions that follow should be read broadly to encompass various other services that accept user ratings and/or comments. Detecting fraudulent ratings and/or comments may provide benefits such as more accurate ranking of applications and/or content. Additionally, fraudulent ratings/comments may be related to other scrupulous on-line behavior. For example, a malware developer may attempt to increase the distribution of a malware application by fraudulently boosting its rating. Therefore, detecting fraudulent ratings and/or comments may protect users from undesirable content.

FIG. 1 depicts a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include one or more client devices, for example, one or more mobile devices (e.g., mobile device 102) and/or one or more computers (e.g., personal computer 104). Network setup 100 may include other types of client devices, as explained in more detail below. Network setup 100 may include an application service 106, where the application service may include various computers, servers, databases, routers, switches, connections and other circuitry, devices and the like. Network setup 100 may include a network, for example, network 108. Various client devices (e.g., client devices 102, 104) may be in communication with an application service 106 via a network 108. Network 108 may be a medium used to provide communication links between various devices, such as data processing systems, computers, servers, mobile devices and perhaps other devices. Network 108 may include connections such as wireless or wired communication links. In some examples, network 108 may represent a worldwide collection of networks and gateways that use the Transmission Control Protocol Internet Protocol (TCP IP) suite of protocols to communicate with one another. In some examples, network 108 may include or be part of an intranet, a local area network (LAN) or a wide area network (WAN). In some examples, network 108 may be part of the internet.

Network setup 100 may include one or more client devices, for example, one or more mobile devices (e.g., mobile device 102) and/or one or more computers (e.g., personal computer 104 such as a desktop or laptop). The mobile device 102 of FIG. 1 may be depicted as a smartphone, but the systems, methods, routines and/or techniques of the present disclosure may work with other mobile devices (e.g., cell phones, tablets, smart watches, PDA's, laptop computers, etc.) or other computers or data processing systems in general. Network setup 100 may include other client devices that have data processing capabilities, for example, smart TVs, smart set-top boxes, etc. Various descriptions herein may reference hardware, software, applications and the like of mobile devices; however, it should be understood that the descriptions may apply to other devices and/or other computers, for example, any device that may download, install and/or run an application and/or software program. Client devices 102, 104 may communicate with various servers, for example, application servers (e.g., part of application service 106), to download applications, application packages, software programs, executables and/or the like. Client devices 102, 104 may also view and access pages (e.g., webpages or application pages) or other interfaces related to applications, where the pages are hosted or served by the application service 106 (e.g., by an application store). Users of client devices may use these pages or other interfaces to receive information about an application or submit information about an application.

Network setup 100 may include one or more application services, for example, application service 106. An application service 106 may include various computers, servers, data stores, routers, switches, connections and other circuitry, devices, modules and the like. These various components of an application service 106 may communicate and operate together to provide a unified service that various client devices can access. For example, application service may be accessible to a client device at one or more known network addresses, for example, IP addresses. Application service 106 may host or store various applications, application packages, software programs, executables and/or the like, such that client devices 102, 104 may download the applications, application packages, software programs, executables and/or the like. Application service 106 may host or serve (e.g., via an application store) various pages (e.g., webpages or application pages) related to applications, such that client devices 102, 104 may view and access the pages. The pages may provide information about an application or may receive information about an application, for example, information submitted by a user of a client device.

Figure 2:
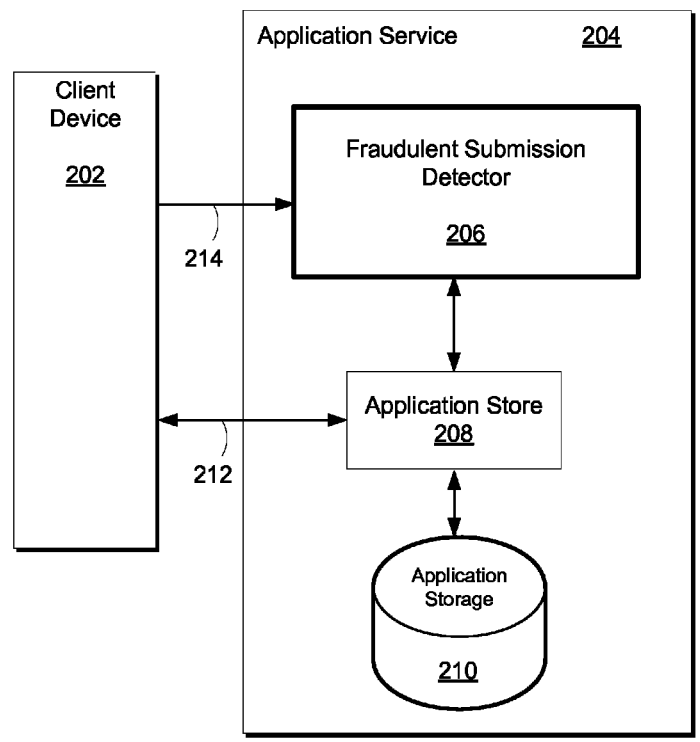
FIG. 2 depicts a block diagram showing example components, modules, routines, connections and interactions of an example application service, according to one or more embodiments of the present disclosure.

FIG. 2 depicts a block diagram showing example components, modules, routines, connections and interactions of an example application service 204, according to one or more embodiments of the present disclosure. Application service 204 may be similar to application service 104 of FIG. 1, for example. Application service 204 may include a fraudulent submission detector 206. Application service 204 may include an application store service (or just application store 208), which may be in communication with application storage 210. Application service 204 may be in communication with one or more client devices, for example, client device 202. Client device 202 may be similar to client device 102 and/or client device 104 of FIG. 1, for example. As one specific example of a communication between client device 202 and application service 204, client device 202 may establish a communication link 212 with application store 208, for example, to download applications or to submit a rating/comment/review/user-flag of an application. As another specific example of a communication between client device 202 and application service 204, application service 204 may receive (e.g., via communication link 214) user submissions (e.g., ratings, comments, reviews, abuse flags, shares, likes, +1's or other social networking interactions, etc.) related to applications. In this setup, the user of client device 202 may be interacting with application store 208, but submissions sent by the client device may be intercepted by the fraudulent submission detector 206 and analyzed before the submissions are allowed to take effect in the application store 208.

Application store 208 (also referred to as an application marketplace) may be an on-line service that allows users to discover and download software applications through an interface associated with the application store 208. The interface may be, for example, a webpage that may be viewed by a user via a web browser (e.g., a desktop browser or a mobile browser). As another example, the interface may be a mobile application that runs natively on a mobile device or other computing device. The interface may allow users to browse and search a catalog or database (e.g., application storage 210) of available applications. The interface may allow users to select an application for download and installation. The interface may allow users to view information related to the application, for example, a general description of the application, reviews of the application submitted by other users and/or a rating of the application (e.g., [1-5] stars out of 5 stars, or a first number [integer or decimal] out of a second maximum number). The interface may allow users to submit information (i.e., submissions) related to the application, for example, reviews of the application and/or a rating of the application. It should be understood that although various descriptions herein may refer to an application store for mobile devices, in some embodiments, application store 208 may be an application store that services non-mobile devices.

Fraudulent submission detector 206 may receive submissions (e.g., ratings, comments, reviews, abuse flags, shares, likes, +1's or other social networking interactions, etc.) from one or more client devices (e.g., client device 202) and/or from an application store 208. As one example, a rating or comment may be submitted to application store 208 (e.g., by client device 202), and then fraudulent submission detector 206 may receive the submitted information by communicating with application store 208. In this situation, application store 208 may allow the rating/comment to take effect and then may revoke the rating/comment if the fraudulent submission detector 206 determines that the rating/comment is fraudulent. Alternatively, the application store 208 may hold a submitted rating/comment in limbo until the fraudulent submission detector makes a determination/conclusion about the rating/comment. As another example, a rating or comment may be submitted by client device 202 and the rating/comment may route through the fraudulent submission detector 206 before it makes its way to the application store 208. The fraudulent submission detector 206 may analyze the rating/comment, and if it determines that the rating/comment is not fraudulent, it may communicate the rating/comment to the application store 208.

Fraudulent submission detector 206 may analyze submissions (e.g., ratings, comments, reviews, abuse flags, shares, likes, +1's or other social networking interactions, etc.), including current (e.g., recently received) submissions and/or past (e.g., logged or saved) submissions. Past submissions may be stored in various places, for example, one of the following: the fraudulent submission detector 206, the application store 208 and application storage 210. Using current submission information past/logged submission information, the fraudulent submission detector 206 may differentiate fraudulent information or spam from legitimate information, e.g., legitimate information submitted by a real user of an application. Once a fraudulent submission is detected, the fraudulent submission detector 206 may send a detection conclusion (e.g., signaling a fraudulent rating/comment) to various services that may use the detection conclusion. For example, application store 208 may use the detection conclusion to ignore a rating/comment, or to penalize a user or account associated with the fraudulent rating/comment, or to penalize the benefactor (e.g., an application or its developer) of a fraudulent positive submission.

Figure 3:
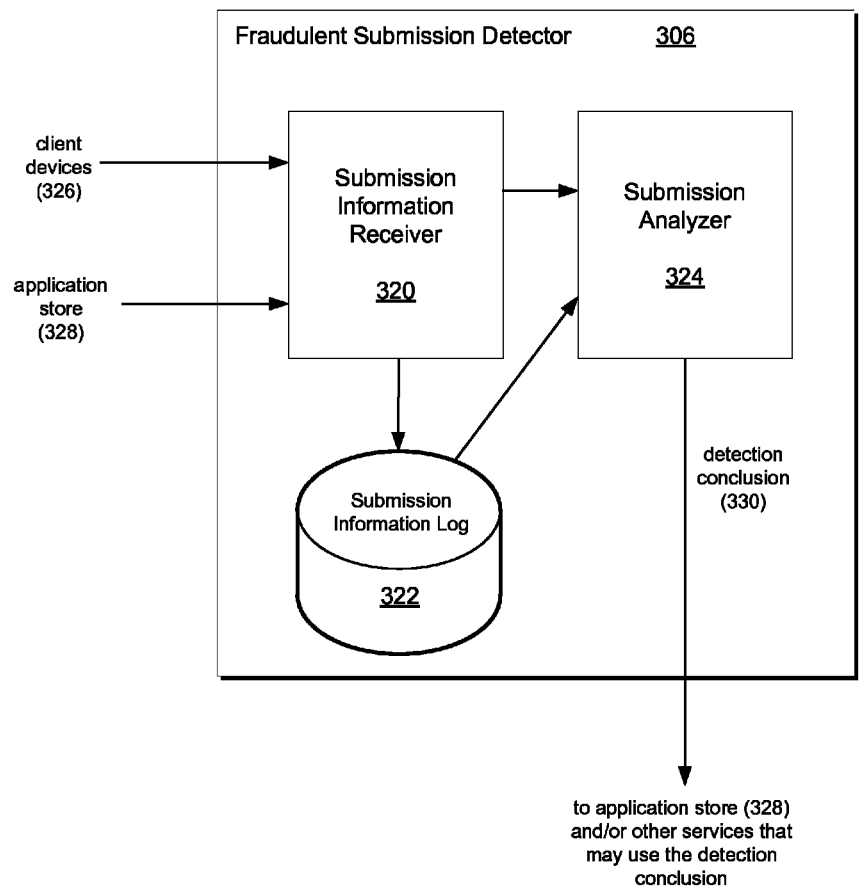
FIG. 3 depicts a block diagram showing example components, modules, routines, connections and interactions of an example fraudulent submission detector, according to one or more embodiments of the present disclosure.

FIG. 3 depicts a block diagram showing example components, modules, routines, connections and interactions of an example fraudulent submission detector 306, according to one or more embodiments of the present disclosure. Fraudulent submission detector 306 may be similar to fraudulent submission detector 206 of FIG. 2, for example. Fraudulent submission detector 306 may include a submission information receiver 320. Fraudulent submission detector 306 may include a submission information log 322. Fraudulent submission detector 306 may include a submission analyzer 324. Fraudulent submission detector 206 may receive submissions (e.g., ratings, comments, reviews, abuse flags, shares, likes, +1's or other social networking interactions, etc.) from one or more client devices (generally indicated by reference number 326) and/or from an application store (generally indicated by reference number 328). Client devices 326 may include client devices similar to client device 202 of FIG. 2, for example. Application store 328 may be similar to application store 208 of FIG. 2, for example.

Submission information receiver 320 may receive submissions (e.g., ratings, comments, reviews, abuse flags, shares, likes, +1's or other social networking interactions, etc.) from one or more client devices (generally indicated by reference number 326) and/or from an application store (generally indicated by reference number 328). Submissions may include various pieces of submission information in addition to the core of the submission (e.g., the rating, comment, etc.). Submission information may be various pieces of information related to a submission, for example, the content/text of a comment/review, the length of a comment/review, a rating (e.g., [integer or decimal] stars out of [maximum integer]), the IP address form which the rating/comment originated, the geographic location from which the rating/comment originated, account information associated with the user that entered the submission (e.g., username, age of account, etc.), and various other pieces of information. Submission information receiver 320 may store or cause to be stored (e.g., in submission information log 322) submissions/submission information that it receives, for example, such that the submissions/submission information may be used at a later time in conjunction with more-recently-received submissions/submission information to detect trends, patterns, and the like in the submissions. In some embodiment, instead of (or in conjunction with) storing submissions/submission information in submission information log 322, submissions/submission information may be stored elsewhere, for example, in application store 208 or application storage 210.

Submissions/submission information (e.g., stored in submission information log 322) may be indexed or organized in various ways that may aid the submission analyzer 324 in detecting various trends, patterns and the like. For example, submissions/submission information may be indexed by or associated with a particular user or account. User-associated data may help detect bad actors/users. As another example, submissions/submission information may be indexed by or associated with a particular application, game or other content such as movies, music, etc. As another example, submissions/submission information may be indexed by or associated with the developer of the content. Application-associated data may help detect applications that are the target of fraudulent ratings/comments. Submissions/submission information may also be useful regardless of its association with users and/or applications. For example, submissions/submission information may be used to detect fraudulent interactions or transactions, related or unrelated to particular users and/or applications.

Submission analyzer 324 may consider one or more of the indexing schemes (e.g., by user, by application, regardless of user/application) just discussed to analyze or compare various submissions and/or pieces of submission information. In this respect, submission analyzer 324 may detect trends, patterns, similarities or the like in submissions, for example, on a per-user basis, on a per-application basis, and/or on a per-interaction basis. Detecting trends, patterns, similarities or the like on a per-user basis may help detect users that are outliers (e.g., in the type or frequency of their interactions). Detecting trends, patterns, similarities or the like on a per-application basis may help detect specific applications that are the target of fraudulent ratings/comments (perhaps indicating that the application is malware or some other type of undesirable applications). Detecting trends, patterns, similarities or the like on a per-interaction basis may help detect different types of user interactions or submissions that are suspiciousness, for example, because of their content alone. Additionally, submission analyzer 324 may use a service, algorithm, routine or the like that detects accounts or users that are related (e.g., likely owned by the same person). Related users/accounts may have been created in a suspicious way or may be known to be fraudulent. Related users/accounts are not necessarily bad, but if other suspicious factors exist with regard to particular user submissions, the fact that the submissions are tied to related accounts may increase the suspicion. Therefore, regarding various descriptions herein that discuss making determinations on a per-user basis, it should be understood that alternate embodiments may include similar determinations that consider related users/accounts as being the same user.

Submission analyzer 324 may receive and analyze submissions/submission information from the submission information receiver 320 (e.g., current or recently-received submission information) and, optionally, previously-received submissions/submission information (e.g., from submission information log 322). Submission analyzer 324 may analyze submission information to automatically detect trends, patterns and the like that may indicate that a submission is fraudulent. Submission analyzer 324 may automatically generate one or more intermediate signals that may indicate that a submission is fraudulent. Submission analyzer 324 may automatically combine or aggregate one or more intermediate signals to generate a detection conclusion (e.g., 330) for a submission. The following describes various factors or signals that the submission information analyze 324 may detect or consider when determining whether a submission is fraudulent (e.g., not submitted by a legitimate user).

Submission analyzer 324 may consider the content or origin of comments/reviews. Submission analyzer 324 may analyze a current or incoming comment to look for indications that the comment may be fraudulent. Submission analyzer 324 may use various rules and/or thresholds based on past experience with and/or expert knowledge regarding user comments. For example, a rule may say that a long comment is less likely to be spam, because, for example, if a comment contains a specific description of why the application is good/bad, it is more likely to be a legitimate comment. Submission analyzer 324 may compare the length of a comment/review to one or more defined thresholds, and if the length exceeds the threshold(s), the comment/review may be more likely to be fraudulent. Submission analyzer 324 may use various routines, algorithms and the like that identify comments that are likely to be spam. For example, the routines, algorithms and the like may utilize trained (e.g., machine-learning) models to detect different types of spam messages. As one specific example, the routines, algorithms and the like may detect common types of spam, for example, links promoting particular types of websites (e.g., adult and pharmaceutical websites). As another specific example, the routines, algorithms and the like may detect user accounts that are created solely for the purpose of spamming, and comments that are associated with these accounts may be highly likely to be fraudulent. Submission analyzer 324 may generate a suspicion score for comment/review. If the suspicion score is above a defined threshold, submission analyzer 324 may generate an intermediate signal that indicates an enhanced likelihood of the current comment/review being fraudulent. This intermediate signal may be used to generate and output a detection conclusion (e.g., 330) that indicates that the current submission is fraudulent.

Submission analyzer 324 may detect very similar user submissions. A user submission (e.g., ratings, comments, reviews, abuse flags, shares, likes, +1's or other social networking interactions, etc.) that is very similar (e.g., within a defined threshold) to another (or several other) user submissions may indicate that the user submission is too repetitive to be legitimate. Submission analyzer 324 may compare a current submission to one or more previously received submissions (e.g., submissions stored/logged in submission information log 322). Similarity between submissions may be determined by looking at various pieces of information/data associated with the submissions, for example, content/text of a comment/review (e.g., the similarity of words used in comments), length of a comment/review, a rating (e.g., [integer] stars out of [maximum integer]), the IP address from which the submission originated, the geographic location from which the submission originated, account information associated with the user that entered the submission (e.g., age of account), and various other pieces of information. As a specific example of similarity between the content/text of comments/reviews, if there is suspiciously repetitive wording (e.g., the same or similar comments appear over and over) between multiple comment/reviews, this may indicate that the comments/reviews are fraudulent. Submission analyzer 324 may consider one or more of the above mentioned pieces of information to determine similarity between submissions. As one specific example, of how the submission analyzer 324 may determine whether two submissions are "too similar," the submission analyzer 324 may generate a similarity score based on how many pieces of information match between the two submissions. If a previous submission is for the same user and/or same application as the current submission, the similarity score may be increased. If the similarity score is above a defined threshold, submission analyzer 324 may generate an intermediate signal that indicates an enhanced likelihood of the current submission being fraudulent. This intermediate signal may be used to generate and output a detection conclusion (e.g., 330) that indicates that the current submission is fraudulent.

Submission analyzer 324 may consider the distribution of ratings. A user rating may be some number "out of" another maximum number. For example, a user rating may be [1-5] stars out of 5 stars, or a first number (integer or decimal) out of a second maximum integer. Each increment (e.g., one integer) of the user rating may be indicated by some icon, such as a star. Multiple users may submit a user rating for a particular application (or game or movie or developer, etc.), and the user ratings from multiple users may be aggregated (e.g., averaged) to create an overall user rating, for example, a number (integer or decimal) "out of" the same maximum integer (e.g., 3.5 stars out of 5 stars). The distribution of ratings in a group of related ratings (e.g., ratings for the same application or ratings from the same user) may indicate that the rating is illegitimate. For example, if a group of ratings includes an inordinate amount (e.g., above a determined percentage) of maximum ratings (e.g., 5-stars) or minimum ratings (e.g., 1-star), the group of ratings may be inherently more suspicious than if the ratings group included a more typical distribution of ratings (e.g., a certain % of each rating value). Additionally, any current or incoming ratings that align with the suspicious ratings group may be suspicious. Submission analyzer 324 may determine whether a current or incoming rating is suspicious and may generate an intermediate signal that indicates an enhanced likelihood of the current rating being fraudulent. This intermediate signal may be used to generate and output a detection conclusion (e.g., 330) that indicates that the current submission is fraudulent.

Submission analyzer 324 may consider the number of user submissions as a fraction of the number of application downloads/installations. Submission analyzer 324 may compute or maintain a ratio (e.g., per application and/or per user) of the number of user submissions (e.g., ratings, comments, reviews, abuse flags, shares, likes, +1's or other social networking interactions, etc.) over (i.e., as a fraction of) the number of downloads/installations of the associated application. The idea may be that a small percentage of users that download/install an application actually take the time to rate or review the application. If every user that downloads a particular application rates it, this may indicate fraudulent behavior. Similarly, if a particular user rates or reviews every application the user downloads/installs, this may indicate fraudulent behavior. Alternatively, this may indicate that the user is just very active, which may not be a problem. Therefore, it can be seen that aggregating the various signals/factors as described herein may avoid allotting too much emphasis to any one signal/factor. Submission analyzer 324 may compare the computed ratio to a threshold to determine whether the ratio of submission is too high. The threshold may be based on, for example, a study or computed statistics that show that only 10% of users that download an application rate it and/or comment on it. Submission analyzer 324 may compare the computed ratio to ratios of submission for other applications or users, for example, to determine whether the current user or application is far outside (e.g., beyond a determined threshold) an average ratio for other applications/users. Submission analyzer 324 may determine whether a current or incoming rating/comment is suspicious (e.g., because it pushes a computed submission ratio outside of acceptable ranges) and may generate an intermediate signal that indicates an enhanced likelihood of the current rating/comment being fraudulent. This intermediate signal may be used to generate and output a detection conclusion (e.g., 330) that indicates that the current submission is fraudulent.

Submission analyzer 324 may consider various client device usage indications in conjunction with user submissions. For example, submission analyzer 324 (or some other module of fraudulent submission detector 306) may receive usage information from client devices 326. Usage information may include indications of whether and when applications crash, whether and when applications were installed and/or launched, and other usage indications. As one example of how submission analyzer may use usage information, if a submission includes complaints about how the application crashes all the time, but the submission analyzer never received any crash reports, this may indicate that the submission is fraudulent. As another example, if a submission includes comments on the application, but the application was never launched, this may indicate that the submission is fraudulent.

Submission analyzer 324 may detect suspicious submission timing or volume patterns. As one example, submission analyzer 324 may detect high volumes and/or rates of submissions. Submission analyzer 324 may analyze submissions (e.g., ratings, comments, reviews, abuse flags, shares, likes, +1's or other social networking interactions, etc.) per user and/or per application, for example, in response to a current or incoming submission. Submission analyzer 324 may detect, for example, if a single user has submitted an inordinate high volume (e.g., above a defined threshold) of submissions and/or has been entering submissions at an inordinately high rate (e.g., above a defined threshold). As one specific example, if a user submits ratings for 1,000 apps in a day, the user ratings are likely fraudulent. Submission analyzer 324 may determine whether a current or incoming rating/comment is suspicious (e.g., because of the high volume/rate) and may generate an intermediate signal that indicates an enhanced likelihood of the current rating/comment being fraudulent. This intermediate signal may be used to generate and output a detection conclusion (e.g., 330) that indicates that the current submission is fraudulent.

As another example of detecting suspicious submission timing or volume patterns, submission analyzer 324 may compare a current submission to one or more previously received submissions (e.g., submissions stored/logged in submission information log 322). Submission analyzer 324 may look at time information related to previously received submissions (e.g., timestamps related to when the submission was received). Submission analyzer 324 may detect suspicious submission timing related to applications and/or users. For example, if a particular user rates a large number of applications, one right after the other, this may indicate that the submissions are fraudulent. As another example, if a particular application receives a large number of submissions, one right after the other, this may indicate that the submissions are fraudulent. Submission analyzer 324 may use known "normal" quantities or rates of submission to determine whether a detected pattern or submission is suspicious. Submission analyzer 324 may detect whether a series of submissions (e.g., X [integer or decimal] submissions within Y [time period]) is greater than a known or defined threshold, and if the threshold is exceeded, submission analyzer 324 may generate an intermediate signal that indicates an enhanced likelihood of a recent submission being fraudulent. This intermediate signal may be used to generate and output a detection conclusion (e.g., 330) that indicates that the current submission is fraudulent.

As another example of detecting suspicious submission timing or volume patterns, submission analyzer 324 may detect suspicious intervals between submissions. For example, if submissions for a particular application were each submitted exactly 5 minutes (or other fixed interval) apart from each other, this may indicate that the submissions are fraudulent (e.g., a computer or machine may be entering the submissions). As another example, if submissions from a particular user were each submitted exactly 5 minutes (or other fixed interval) apart from each other, this may indicate that the submissions are fraudulent. Submission analyzer 324 may use more advanced or smart detection algorithms to detect more intricate or non-random submission intervals. For example, if a machine enters submissions at varying intervals, but the intervals repeat after a while, submission analyzer 324 may detect these kinds of suspicious submission patterns as well. Submission analyzer 324 may detect whether a submission pattern is too "automated" (e.g., repeating or some other non-random pattern) by assigning a submission sequence an automation score. If the automation score exceeds a defined threshold, submission analyzer 324 may generate an intermediate signal that indicates an enhanced likelihood of a recent submission being fraudulent. This intermediate signal may be used to generate and output a detection conclusion (e.g., 330) that indicates that the current submission is fraudulent.

As explained in more detail above, submission analyzer 324 may generate various detection conclusions (e.g., 330), where each detection conclusion may indicate that a user submission is fraudulent. Each detection conclusion may be based on one or more of the intermediate signals or factors discussed above. Submission analyzer 324 may weight or emphasize (or de-emphasize) one or more of the detection conclusions, for example, based on the importance of the detection conclusion and/or the impact that the detection conclusion will have on the overall single detection conclusion. Weights for use in emphasizing/de-emphasizing may be derived automatically (e.g., via machine learning from examples) or via human expert knowledge. Submission analyzer 324 may utilize an algorithm or equation to generate the overall single detection conclusion. The algorithm or equation may combine some or all of the detection conclusions (e.g., weighted) using an aggregation technique, for example, weighted linear combination or multiplicative combination. The weights may be derived using linear regression, logistic regression, or other regression model. In some embodiments, submission analyzer 324 may consider ratios of suspicious submissions to non-suspicious submissions. For example, submission analyzer 324 may consider, for a particular user, the ratio of suspicious submissions to non-suspicious submissions. As another example, submission analyzer 324 may consider, for a particular application, the ratio of suspicious submissions to non-suspicious submissions. Considering such ratios may increase the accuracy of the fraudulent submission detector 306. In some situations, perhaps the various detection routines described herein may incorrectly flag a submission as fraudulent. By considering such ratios, legitimate users and non-suspicious applications may avoid being penalized for false detections.

Each detection conclusion (e.g., 330) may include various pieces of information that may be useful to various other services. For example, a detection conclusion may include information about the user(s) or account(s) responsible for the submission. As another example, the detection conclusion may include information about which application(s) were the target of the submissions. As another example, the detection conclusion may include an indication of the level of suspicion for the associated submission. Levels of suspicion may include, for example, "suspicious," "highly suspicious," and perhaps other levels.

Submission analyzer 324 may output various detection conclusions (e.g., 330) to various other services, modules or the like that may use the detection conclusions. In some embodiments, the detection conclusions may be manually reviewed (e.g., by a person) and penalties may be manually imposed (e.g., by manually making a change in a database). In some embodiments, the detection conclusions may be automatically reviewed and penalties may be automatically imposed. It should be understood that various descriptions herein that describe reviewing or analyzing detection conclusions may be performed manually or automatically. It should be understood that various descriptions herein that describe imposing penalties may be performed manually or automatically.

As one example, the application store 208 may receive various detection conclusions related to fraudulent submissions. The application store 208 may determine which software applications (e.g., hosted by the application store) and/or which users/accounts are associated with the fraudulent submissions. The application store 208 may impose penalties on applications and/or users associated with fraudulent submissions. Penalties may increase the cost associated with fraudulent submissions, and may deter such actions. Additionally, penalties may remedy the effects of the fraudulent submission.

Penalties to users may include warning a user, suspending (e.g., temporarily) a user account, cancelling (e.g., permanently) a user account, and perhaps penalizing accounts related to the user account. Penalties to applications may include removing suspicious submissions (e.g., ratings, reviews, comments, etc.) from hosted webpage associated with the target applications. In this respect, users of the application store may be unable to see the fraudulent ranking/comments. Penalties to applications may include altering the way target applications appear in search results, rankings, suggestions and the like. For example, if a user searches the application store 208 by keyword or browses applications by category, applications that are being penalized may appear (e.g., be ranked) lower than they otherwise would if they were not being penalized. For example, ranking algorithms may ignore fraudulent rankings and/or comments. In some situations, an application being penalized may be removed form search results, rankings, suggestions and the like. In some situations, an application being penalized may be removed entirely from the application store, for example, by deleting the application (e.g., in application storage 210) and the webpage associated with the application.

In some embodiments, the application store may determine whether a fraudulent submission was intended to increase or decrease the popularity or ranking of the targeted applications. Not all applications that are the target of fraudulent submissions deserve to be penalized. For example, if fraudulent submissions for a target application were submitted by a competitor to decrease the popularity ranking of the target application, the target application may not be penalized. As one example, fraudulent ratings that are positive are more likely to result in applications being penalized.

Although various descriptions herein describe an application store and how an application store may receive submissions (e.g., ratings, comments, etc.) and how an application store may use various detection conclusions (e.g., 330), it should be understood that other services may implement similar techniques. For example, a social networking service or a cloud video service may analyze received comments, likes, +1's, etc. to detect fraudulent submissions, and may penalize users/accounts responsible for the submissions and/or pages, accounts, etc. that are the target of the submissions. Various other services (e.g., on-line product shopping, on-line review of services rendered, on-line review of establishments, etc.) that accept user submissions (e.g., ratings, comments, etc.) may implement similar techniques.

Certain embodiments of the present disclosure may be found in one or more methods for automatic detection of fraudulent ratings and/or comments related to an application store. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

Figure 4:
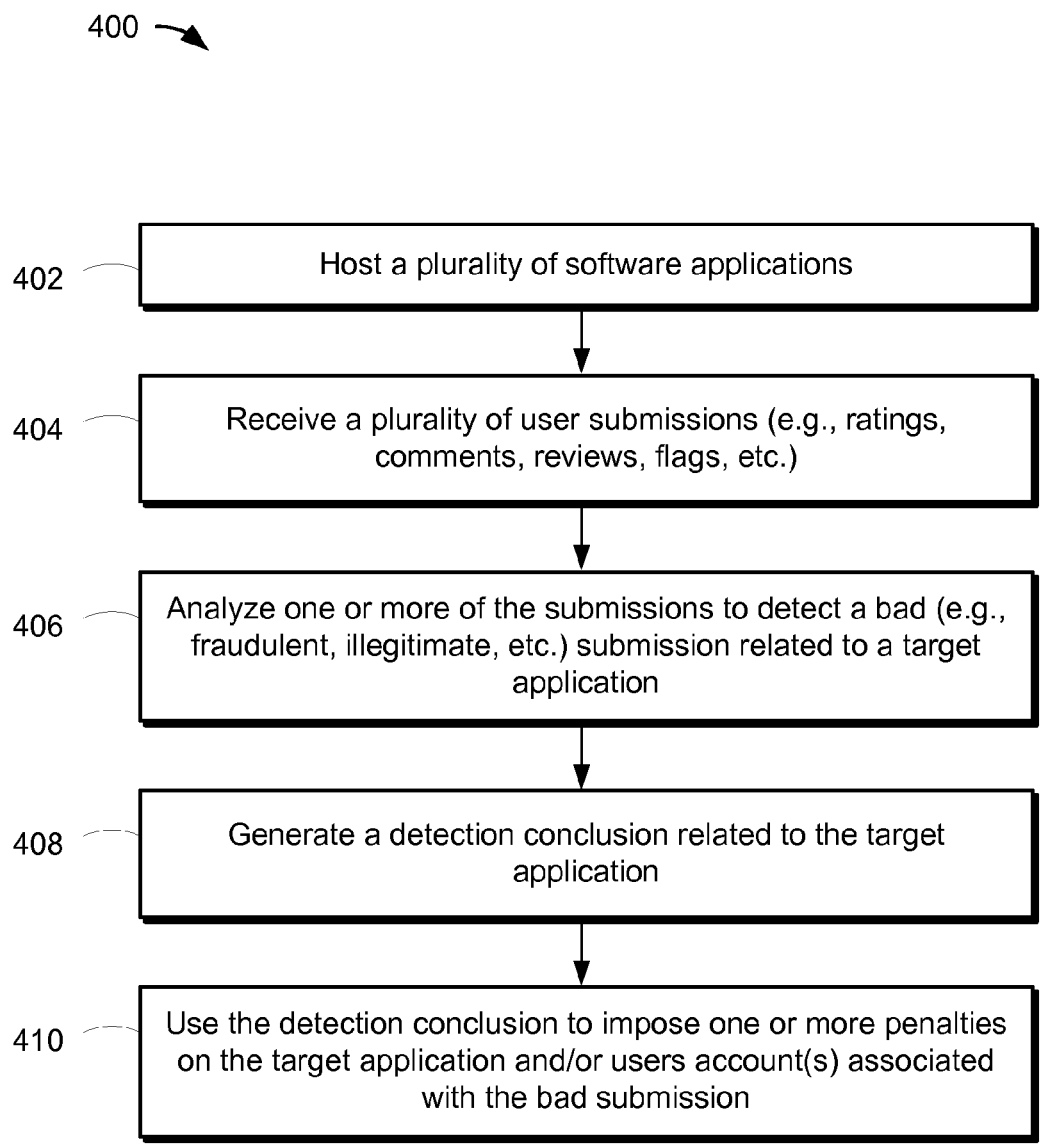
FIG. 4 depicts a flow diagram that shows example steps in a method for automatic detection of fraudulent ratings and/or comments related to an application store, according to one or more embodiments of the present disclosure.

FIG. 4 depicts a flow diagram 400 that shows example steps in a method for automatic detection of fraudulent ratings and/or comments related to an application store, according to one or more embodiments of the present disclosure. At step 402, an application service (e.g., application service 206) may host a plurality of software applications (e.g., using application storage 210). At step 404, a fraudulent submission detector (e.g., 206) may receive a plurality of user submissions (e.g., ratings, comments, reviews, abuse flags, shares, likes, +1's or other social networking interactions, etc.). At step 406, the fraudulent submission detector may analyze one or more of the submissions to detect a bad or undesirable submission (e.g., a fraudulent, spam-infested or otherwise not legitimate submission) related to at target application (e.g., one of the applications hosted by the application service). At step 408, the fraudulent submission detector may generate a detection conclusion related to the target applications, as explained in detail herein. At step 410, various services, modules, routines or the like may use the detection conclusion to alter their behavior. For example, a service may impose one or more penalties on the target application and/or user account(s) associated with the bad or undesirable submission. As a specific example, an application store (e.g., part of the application service) may use the detection conclusions to affect the rankings and/or suggestions of applications, as described herein.

Figure 5:
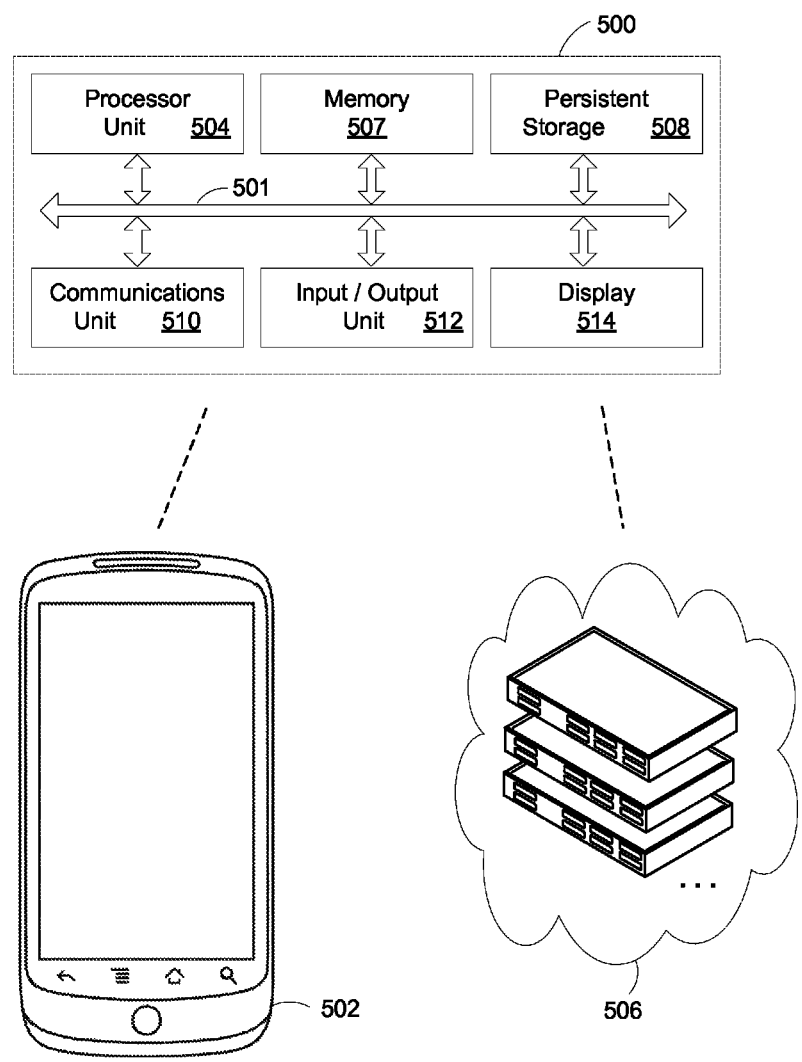
FIG. 5 depicts a block diagram of an example data processing system that may be included within one or more of client devices and/or included within an application service as described herein.

FIG. 5 depicts a block diagram of an example data processing system 500 that may be included within one or more client devices (e.g., mobile device 502) and/or included within one or more of the various computers, servers, routers, switches, devices and the like included in an application service (e.g., 506) as described herein. The data processing system 500 may be used to execute, either partially or wholly, one or more of the methods, routines and/or solutions of the present disclosure. In some embodiments of the present disclosure, more than one data processing system, for example data processing systems 500, may be used to implement the methods, routines, techniques and/or solutions described herein. In the example of FIG. 5, data processing system 500 may include a communications fabric 501 which provides communications between components, for example a processor unit 504, a memory 507, a persistent storage 508, a communications unit 510, an input/output (I/O) unit 512 and a display 514. A bus system may be used to implement communications fabric 501 and may be comprised of one or more buses such as a system bus or an input/output bus. The bus system may be implemented using any suitable type of architecture that provides for a transfer of data between different components or devices attached to the bus system.

Processor unit 504 may serve to execute instructions (for example, a software program/application, source code for a program/application, native OS code and the like) that may be loaded into the data processing system 500, for example, into memory 507. Processor unit 504 may be a set of one or more processors or may be a multiprocessor core depending on the particular implementation. Processor unit 504 may be implemented using one or more heterogeneous processor systems in which a main processor is present with secondary processors on a single chip. As another illustrative example, processor unit 504 may be a symmetric multiprocessor system containing multiple processors of the same type.

Memory 507 may be, for example, a random access memory or any other suitable volatile or nonvolatile storage device. Memory 507 may include one or more layers of cache memory. Persistent storage 508 may take various forms depending on the particular implementation. For example, persistent storage 508 may contain one or more components or devices. For example, persistent storage 508 may be a hard drive, a solid-state drive, a flash memory or some combination of the above.

Instructions for an operating system may be located on persistent storage 508. In one specific embodiment, the operating system may be some version of a number of known operating systems for mobile devices or smartphones (e.g, Android, iOS, etc.). Instructions for applications and/or programs may also be located on persistent storage 508. These instructions may be loaded into memory 507 for execution by processor unit 504. For example, the methods and/or processes of the different embodiments described in this disclosure may be performed by processor unit 504 using computer implemented instructions which may be loaded into a memory such as memory 507. These instructions are referred to as program code, computer usable program code or computer readable program code that may be read and executed by a processor in processor unit 504.

Display 514 may provide a mechanism to display information to a user, for example, via a LCD screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 512 allows for input and output of data with other devices that may be connected to data processing system 500. Input/output devices can be coupled to the system either directly or through intervening I/O controllers.

Communications unit 510 may provide for communications with other data processing systems or devices, for example, via one or more networks. Communications unit 510 may be a network interface card. Communications unit 510 may provide communications through the use of wired and/or wireless communications links. In some embodiments, the communications unit may include circuitry that is designed and/or adapted to communicate according to various wireless communication standards, for example, cellular standards, WIFI standards, BlueTooth standards and the like.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

Various embodiments of the present disclosure describe one or more systems, methods, routines and/or techniques for automatic detection of fraudulent ratings and/or comments related to an application store. In one or more embodiments, a method includes hosting an application service that provides for users to enter submissions regarding a plurality of hosted applications. The method may include receiving, via the application service, a submission related to a targeted application of the plurality of hosted applications, wherein the submission expresses a review or amount of favorability of the targeted application. The method may include analyzing the submission to detect that the submission is undesirable, wherein the analysis may include aggregating a plurality of signals that indicate that the submission was not entered by a legitimate user of the targeted application. Each of the plurality of signals may be generated by considering the content of the submission and/or the relationship between the submission and other submissions received via the application service and/or information from the application service or a client device. The method may include automatically imposing one or more penalties on the targeted application or user account(s) associated with the undesirable submission. In some embodiments, the analysis may include determining whether the undesirable submission intended to increase or decrease a popularity or ranking of the targeted application.

One or more signals out of the plurality of signals may be based on a ratio that is calculated as a number of received submissions for the targeted application divided by a number of times the targeted application has been downloaded. One or more signals out of the plurality of signals may be based on similarities between the undesirable submission and one or more previously-received submissions, wherein the similarities include contents of submission, age of account associated submission, and an IP address or geographical location from where submission originated. One or more signals out of the plurality of signals may be based on a detection of a high volume or rate of submission from the user account associated with the undesirable submission. One or more signals out of the plurality of signals may be based on a detection of a repeating pattern of time intervals between submissions from the user account associated with the undesirable submission.

The one or more penalties include negatively affecting the way the targeted application appears in search results or suggestions lists if the undesirable submission intended to increase a popularity or ranking of the targeted application, and removing the undesirable submission or preventing the undesirable submission from being displayed to users via the application service if the undesirable submission intended to decrease a popularity or ranking of the targeted application. The one or more penalties include removing the targeted application from the application service if the undesirable submission intended to increase a popularity or ranking of the targeted application, and removing the undesirable submission or preventing the undesirable submission from being displayed to users via the application service if the undesirable submission intended to decrease a popularity or ranking of the targeted application. The one or more penalties include suspending or cancelling a user account associated with the undesirable submission if the undesirable submission intended to increase a popularity or ranking of the targeted application, and removing the undesirable submission or preventing the undesirable submission from being displayed to users via the application service if the undesirable submission intended to decrease a popularity or ranking of the targeted application.

One or more embodiments of the present disclosure may describe a computing device comprising one or more memory units that store computer code, and one or more processor units coupled to the one or more memory units. The one or more processor units execute the computer code stored in the one or more memory units to adapt the computing device to host an application service that provides for users to enter submissions regarding a plurality of hosted applications. The computing device may be further adapted to receive, via the application service, a submission related to a targeted application of the plurality of hosted applications, wherein the submission expresses a review or amount of favorability of the targeted application. The computing device may be further adapted to analyze the submission to detect that the submission is undesirable, wherein the analysis includes aggregating a plurality of signals that indicate that the submission was not entered by a legitimate user of the targeted application. Each of the plurality of signals may be generated by considering the content of the submission and/or the relationship between the submission and other submissions received via the application service and/or information from the application service or a client device. The computing device may be further adapted to automatically impose one or more penalties on the targeted application or user account(s) associated with the undesirable submission. The analysis may include a determination of whether the undesirable submission intended to increase or decrease a popularity or ranking of the targeted application.

One or more signals out of the plurality of signals may be based on a ratio that is calculated as a number of received submissions for the targeted application divided by a number of times the targeted application has been downloaded. One or more signals out of the plurality of signals is based on similarities between the undesirable submission and one or more previously-received submissions, wherein the similarities include contents of submission, age of account associated submission, and an IP address or geographical location from where submission originated. One or more signals out of the plurality of signals is based on a detection of a repeating pattern of time intervals between submissions from the user account associated with the undesirable submission.

The one or more penalties include a negative effect on the way the targeted application appears in search results or suggestions lists if the undesirable submission intended to increase a popularity or ranking of the targeted application, and removal of the undesirable submission or prevention of the undesirable submission from being displayed to users via the application service if the undesirable submission intended to decrease a popularity or ranking of the targeted application. The one or more penalties include removal of the targeted application from the application service if the undesirable submission intended to increase a popularity or ranking of the targeted application, and removal of the undesirable submission or prevention of the undesirable submission from being displayed to users via the application service if the undesirable submission intended to decrease a popularity or ranking of the targeted application.

One or more embodiments of the present disclosure may describe a method that includes receiving a user-submitted rating or comment via an online website, wherein the user-submitted rating or comment relates to a product, service, establishment or location. The method may include determining a plurality of signals that indicate that the user-submitted rating or comment was not submitted by a legitimate user of the website, wherein the determination includes detecting trends or patterns between the user-submitted rating or comment and one or more previously-submitted ratings or comments. The method may include determining whether the user-submitted rating or comment is fraudulent by combining the plurality of signals. The method may include automatically imposing one or more penalties on a user account associated with the user-submitted rating or comment. The method may include automatically imposing a negative effect on the way the product, service, establishment or location is ranked or suggested on the website. The method may include automatically suspending or removing the product, service, establishment or location from the website.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method comprising:
   hosting an application service that provides for users to enter submissions regarding a plurality of hosted applications;
   receiving, via the application service, a submission related to a targeted application of the plurality of hosted applications, wherein the submission expresses a review or amount of favorability of the targeted application;
   analyzing the submission to detect that the submission is undesirable, wherein the analysis includes aggregating a plurality of signals that indicate that the submission was not entered by a legitimate user of the targeted application, and wherein each of the plurality of signals is generated by considering the content of the submission and/or the relationship between the submission and other submissions received via the application service and/or information from the application service or a client device; and
   automatically imposing one or more penalties on the targeted application or user account(s) associated with the undesirable submission,
   wherein one or more signals out of the plurality of signals is based on a ratio that is calculated as a number of received submissions for the targeted application divided by a number of times the targeted application has been downloaded.

2. The method of claim 1, wherein the analysis includes determining whether the undesirable submission intended to increase or decrease a popularity or ranking of the targeted application.

3. The method of claim 2, wherein the one or more penalties include:
   negatively affecting the way the targeted application appears in search results or suggestions lists if the undesirable submission intended to increase a popularity or ranking of the targeted application; and
   removing the undesirable submission or preventing the undesirable submission from being displayed to users via the application service when the undesirable submission intended to decrease a popularity or ranking of the targeted application.

4. The method of claim 2, wherein the one or more penalties include:
   removing the targeted application from the application service if the undesirable submission intended to increase a popularity or ranking of the targeted application; and
   removing the undesirable submission or preventing the undesirable submission from being displayed to users via the application service when the undesirable submission intended to decrease a popularity or ranking of the targeted application.

5. The method of claim 2, wherein the one or more penalties include:
   suspending or cancelling a user account associated with the undesirable submission if the undesirable submission intended to increase a popularity or ranking of the targeted application; and
   removing the undesirable submission or preventing the undesirable submission from being displayed to users via the application service when the undesirable submission intended to decrease a popularity or ranking of the targeted application.

6. The method of claim 1, wherein one or more signals out of the plurality of signals is based on a ratio that is calculated as a number of received submissions for the targeted application divided by a number of times the targeted application has been downloaded.

7. The method of claim 1, wherein one or more signals out of the plurality of signals is based on similarities between the undesirable submission and one or more previously-received submissions, wherein the similarities include contents of submission, age of account associated submission, and an IP address or geographical location from where submission originated.

8. The method of claim 1, wherein one or more signals out of the plurality of signals is based on a detection of a high volume or rate of submission from the user account associated with the undesirable submission.

9. The method of claim 1, wherein one or more signals out of the plurality of signals is based on a detection of a repeating pattern of time intervals between submissions from the user account associated with the undesirable submission.

10. A computing device comprising:
    one or more memory units that store computer code; and
    one or more processor units coupled to the one or more memory units, wherein the one or more processor units execute the computer code stored in the one or more memory units to adapt the computing device to:
    host an application service that provides for users to enter submissions regarding a plurality of hosted applications;
    receive, via the application service, a submission related to a targeted application of the plurality of hosted applications, wherein the submission expresses a review or amount of favorability of the targeted application;
    analyze the submission to detect that the submission is undesirable, wherein the analysis includes aggregating a plurality of signals that indicate that the submission was not entered by a legitimate user of the targeted application, and wherein each of the plurality of signals is generated by considering the content of the submission and/or the relationship between the submission and other submissions received via the application service and/or information from the application service or a client device; and
    automatically impose one or more penalties on the targeted application or user account(s) associated with the undesirable submission,
    wherein one or more signals out of the plurality of signals is based on a ratio that is calculated as a number of received submissions for the targeted application divided by a number of times the targeted application has been downloaded.

11. The computing device of claim 10, wherein the analysis includes a determination of whether the undesirable submission intended to increase or decrease a popularity or ranking of the targeted application.

12. The computing device of claim 11, wherein the one or more penalties include:
a negative effect on the way the targeted application appears in search results or suggestions lists if the undesirable submission intended to increase a popularity or ranking of the targeted application; and
removal of the undesirable submission or prevention of the undesirable submission from being displayed to users via the application service when the undesirable submission intended to decrease a popularity or ranking of the targeted application.

13. The computing device of claim 11, wherein the one or more penalties include:
removal of the targeted application from the application service if the undesirable submission intended to increase a popularity or ranking of the targeted application; and
removal of the undesirable submission or prevention of the undesirable submission from being displayed to users via the application service when the undesirable submission intended to decrease a popularity or ranking of the targeted application.

14. The computing device of claim 10, wherein one or more signals out of the plurality of signals is based on a ratio that is calculated as a number of received submissions for the targeted application divided by a number of times the targeted application has been downloaded.

15. The computing device of claim 10, wherein one or more signals out of the plurality of signals is further based on similarities between the undesirable submission and one or more previously-received submissions, wherein the similarities include contents of submission, age of account associated submission, and an IP address or geographical location from where submission originated.

16. The computing device of claim 10, wherein one or more signals out of the plurality of signals is based on a detection of a repeating pattern of time intervals between submissions from the user account associated with the undesirable submission.

17. A method comprising:
receiving a user-submitted rating or comment via an online website, wherein the user-submitted rating or comment relates to a product, service, establishment or location;
determining a plurality of signals that indicate that the user-submitted rating or comment was not submitted by a legitimate user of the website, wherein the determination includes detecting trends or patterns between the user-submitted rating or comment and one or more previously-submitted ratings or comments; and
determining whether the user-submitted rating or comment is fraudulent by combining the plurality of signals,
wherein one or more signals out of the plurality of signals is based on a ratio that is calculated as a number of received submissions for the targeted application divided by a number of times the targeted application has been downloaded.

18. The method of claim 17, further comprising automatically imposing one or more penalties on a user account associated with the user-submitted rating or comment.

19. The method of claim 17, further comprising automatically imposing a negative effect on the way the product, service, establishment or location is ranked or suggested on the web site.

20. The method of claim 17, further comprising automatically suspending or removing the product, service, establishment or location from the website.

* * * * *